(12) United States Patent  
Abali et al.

(10) Patent No.: US 8,495,267 B2  
(45) Date of Patent: Jul. 23, 2013

(54) MANAGING SHARED COMPUTER MEMORY USING MULTIPLE INTERRUPTS

(75) Inventors: Bulent Abali, Tenafly, NJ (US); John M. Borkenhagen, Rochester, MN (US); Dan E. Poff, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 12/953,982

(22) Filed: Nov. 24, 2010

(65) Prior Publication Data

US 2012/0131248 A1 May 24, 2012

(51) Int. Cl.
  *G06F 13/24* (2006.01)
(52) U.S. Cl.
  CPC .................................. *G06F 13/24* (2013.01)
  USPC ........................... 710/262; 710/264; 710/268
(58) Field of Classification Search
  USPC .......... 710/260–269; 711/100, 170, 149–154, 711/112
  See application file for complete search history.

(56) References Cited

U.S. PATENT DOCUMENTS

| | | | |
|---|---|---|---|
| 5,555,392 A | 9/1996 | Chaput et al. | |
| 5,710,909 A * | 1/1998 | Brown et al. | 711/170 |
| 5,812,817 A | 9/1998 | Hovis | |
| 5,864,859 A * | 1/1999 | Franaszek | 1/1 |
| 6,000,009 A * | 12/1999 | Brady | 711/112 |
| 6,092,171 A * | 7/2000 | Relph | 711/203 |
| 6,516,397 B2 * | 2/2003 | Roy et al. | 711/170 |
| 6,564,305 B1 * | 5/2003 | Moore | 711/154 |
| 6,658,549 B2 | 12/2003 | Wilson et al. | |
| 6,681,305 B1 * | 1/2004 | Franke et al. | 711/170 |
| 6,766,429 B1 | 7/2004 | Bland et al. | |
| 6,775,751 B2 | 8/2004 | Tremaine | |
| 6,813,689 B2 * | 11/2004 | Baxter, III | 711/114 |
| 6,820,182 B1 * | 11/2004 | Bauman et al. | 711/170 |
| 6,944,740 B2 | 9/2005 | Abali et al. | |
| 6,956,507 B2 | 10/2005 | Castelli et al. | |
| 6,961,821 B2 | 11/2005 | Robinson | |
| 6,968,424 B1 | 11/2005 | Danilak | |
| 7,024,512 B1 * | 4/2006 | Franaszek et al. | 711/100 |
| 7,302,543 B2 | 11/2007 | Lekatsas et al. | |
| 7,383,399 B2 * | 6/2008 | Vogt | 711/149 |
| 7,636,810 B2 | 12/2009 | Ramakrishnan | |

(Continued)

FOREIGN PATENT DOCUMENTS

WO 9941668 A1 8/1999

OTHER PUBLICATIONS

International Search Report and Written Opinion of the ISA dated Sep. 23, 2011—International Application No. PCT/EP2011/066584.

(Continued)

*Primary Examiner* — Raymond Phan  
(74) *Attorney, Agent, or Firm* — Toler Law Group

(57) ABSTRACT

Systems and methods to manage memory are provided. A particular method may include initiating a memory compression operation. The method may further include initiating a first interrupt configured to affect a first process executing on a processor in response to a first detected memory level. A second initiated interrupt may be configured to affect the first process executing on the processor in response to a second detected memory level, and a third interrupt may be initiated to affect the first process executing on the processor in response to a third detected memory level. At least of the first, the second, and the third detected memory levels are affected by the memory compression operation.

20 Claims, 4 Drawing Sheets

U.S. PATENT DOCUMENTS

| | | | |
|---|---|---|---|
| 7,895,242 B2 * | 2/2011 | Ergan et al. | 707/802 |
| 2002/0161932 A1 * | 10/2002 | Herger et al. | 709/321 |
| 2005/0198460 A1 * | 9/2005 | Herger et al. | 711/170 |
| 2006/0069879 A1 | 3/2006 | Inoue et al. | |
| 2009/0228656 A1 | 9/2009 | Borkenhagen | |
| 2009/0228664 A1 | 9/2009 | Borkenhagen | |
| 2009/0228668 A1 | 9/2009 | Borkenhagen | |

OTHER PUBLICATIONS

Tremaine et al., IBM Memory Expansion Technology (MXT), IBM Journal of Research and Development, vol. 45, No. 2, Mar. 2001, (pp. 271-285).

* cited by examiner

MANAGING SHARED COMPUTER MEMORY USING MULTIPLE INTERRUPTS

I. FIELD OF THE DISCLOSURE

The present disclosure relates generally to computer memory architecture, and in particular, to a system and a method of managing compressed memory.

II. BACKGROUND

Memory compression may optimize available memory by using encoded data. The encoded data may be represented as symbols to take up less space. Memory compression effectively expands memory capacity for some applications without increasing actual physical memory (e.g., dynamic random access memory) and associated expenses. In so doing, a compressed memory system may present a larger real address space to an operating system and/or a hypervisor than is actually available. As a result, real address space (e.g., the amount of available physical memory reported to the OS and/or hypervisor) may be overcommitted. Additionally, the compression ratio may decrease and require more physical memory. The operating system or hypervisor may respond by invalidating real pages to free up physical memory space. The invalidated real pages may be copied to disk and vacated to make room for the compressed data.

Occasionally, physical memory space will not be made available in time to prevent memory exhaustion and associated data loss. For example, processes to vacate memory may be delayed while the system continues to consume additional memory. Additionally, processes unaffected by the operating system or hypervisor may continue to use available memory. Memory consumption may consequently outpace the rate at which space is made available. Precautionary attempts to reserve significant amounts of free physical memory may result in underutilized memory.

III. SUMMARY OF THE DISCLOSURE

In a particular embodiment, a method to manage memory includes initiating a memory compression operation. The method may further include initiating a first interrupt configured to affect a first process executing on a processor in response to a first detected memory level. A second initiated interrupt may be configured to affect the first process executing on the processor in response to a second detected memory level, and a third interrupt may be initiated to affect the first process executing on the processor in response to a third detected memory level. At least of the first, the second, and the third detected memory levels are affected by the memory compression operation.

In another embodiment, an apparatus is disclosed that includes a memory and a processor configured to execute a first process that accesses the memory. The processor may be further configured to initiate a memory compression operation, to initiate generating a first interrupt configured to affect execution of a first process in response to a first detected memory level, to initiate generating a second interrupt configured to affect the execution of the first process in response to a second detected memory level, and to initiate generating a third interrupt configured to affect the execution of first process in response to a third detected memory level. At least of the first, the second, and the third detected memory levels are affected by the memory compression operation.

In another embodiment, a program product includes program code to initiate a memory compression operation that may cause a first interrupt configured to affect execution of a first process in response to a first detected memory level, and may cause a second interrupt configured to affect the execution of first process in response to a second detected memory level, and may cause a third interrupt configured to affect the execution of the first process in response to a third detected memory level. A tangible computer readable storage medium may bear the program code. At least of the first, the second, and the third detected memory levels are affected by the memory compression operation.

An embodiment may efficiently communicate to a hypervisor or to an operating system that physical memory is running out, while minimizing performance impacts due to unnecessary interrupts. A tiered hierarchy of interrupts may efficiently utilize a full range of available memory capacity. A machine check interrupt may minimize an amount of free physical memory space that might otherwise be reserved against a possible delay in responding to an interrupt request. The hierarchical structure and machine check features may result in fewer interrupts and more usable physical memory space. Use of the machine check interrupt in association with a highest priority of memory capacity may function to guarantee free memory and to minimize data loss. Additional usable physical memory space may result in improved system performance.

Features that characterize embodiments are set forth in the claims annexed hereto and forming a further part hereof. However, for a better understanding of embodiments, and of the advantages and objectives attained through their use, reference should be made to the Drawings and to the accompanying descriptive matter.

IV. BRIEF DESCRIPTION OF THE DRAWINGS

Figure 3:
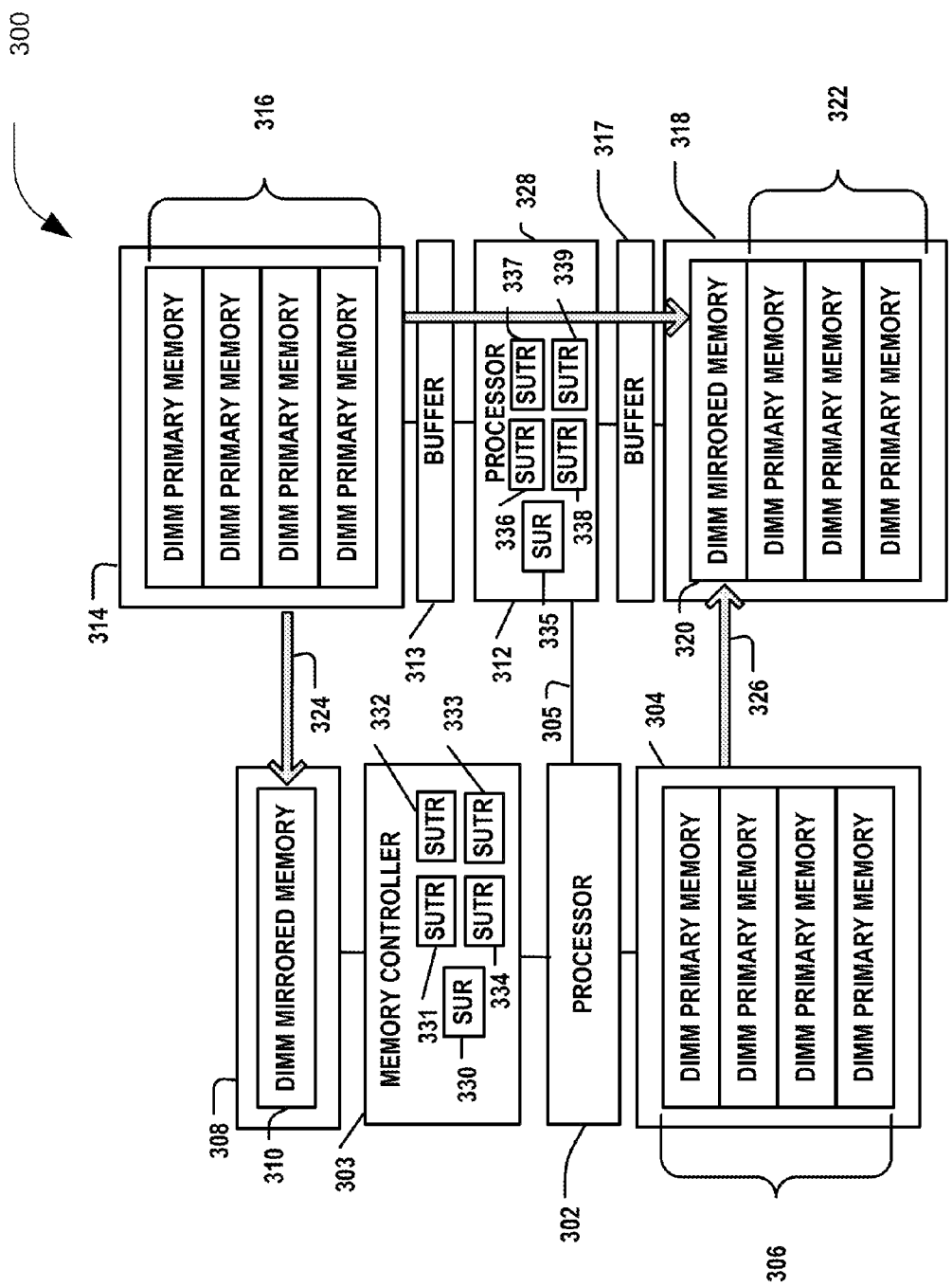
Figure 4:
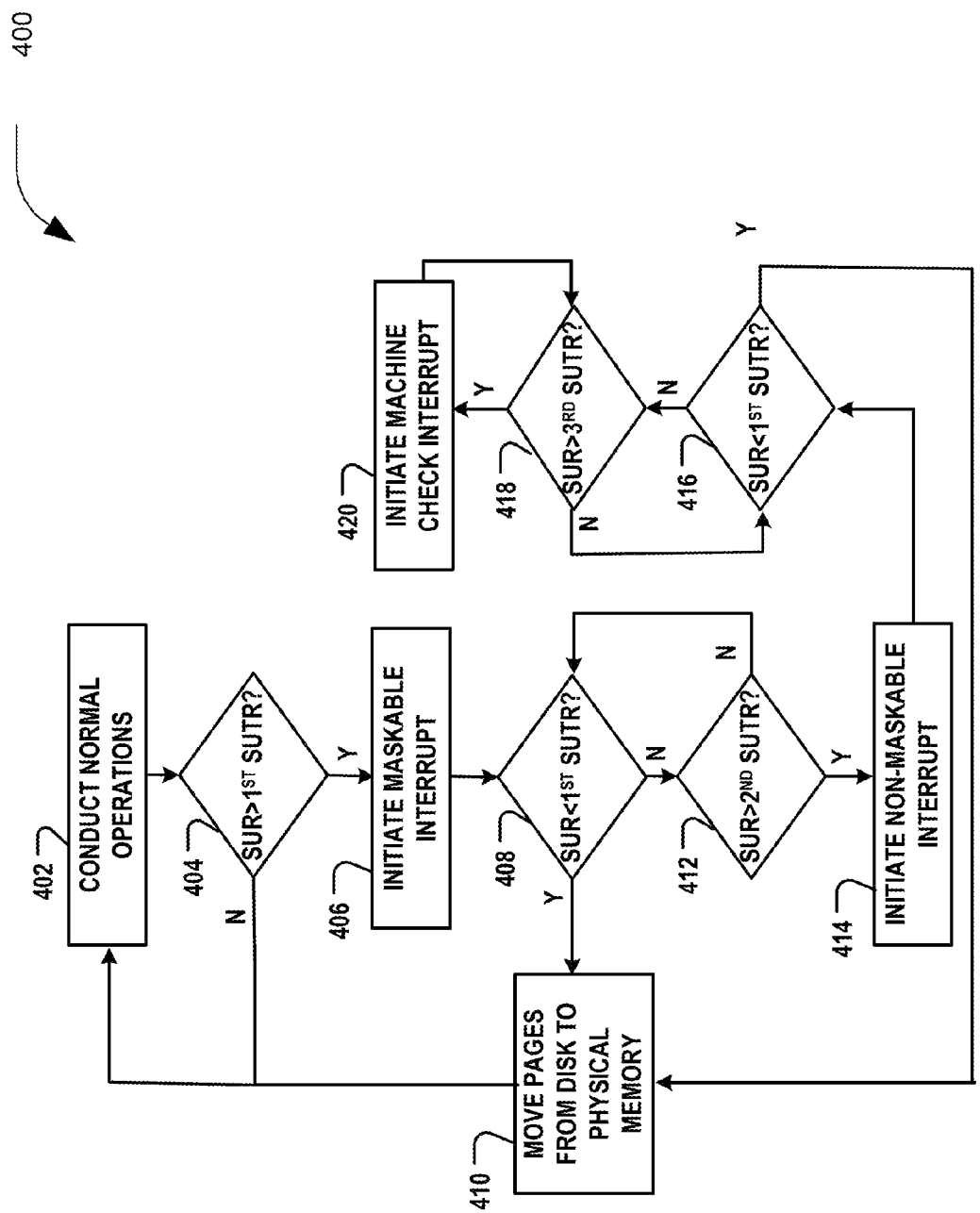

FIG. 3 is a block diagram of an embodiment of a memory compression computing system that uses interrupts that are initiated based on threshold values of sectors used threshold registers to manage processes executed on processors coupled to compressed memory; and FIG. 4 is a flowchart of an embodiment of a method of managing compressed memory that includes using a tiered hierarchy of interrupts associated with different levels of available memory to progressively affect memory related processes.

V. DETAILED DESCRIPTION

A particular embodiment of a compressed memory computing system may use a tiered hierarchy of interrupts that progressively affects system operations more severely based on detected levels of available memory. A machine check interrupt may be configured to temporarily halt all threads on all cores of all processors of the computing system. The threads may be halted immediately and may be under the control of a machine check handler. The machine check interrupt may allow for thread recovery and workload resumption if a corrective action is successful. The machine check handler may signal a hypervisor or an operating system to use existing paging mechanisms to create additional free physical memory space to hold expanding compressed data.

The machine check interrupt may be used only if one or more other interrupts are not serviced before memory is exhausted. Because the machine check interrupt may stop all threads from executing workload, the machine check interrupt has a relatively larger impact on performance than other interrupts, which may be configured to affect only a single thread, socket, or other process executing on a processor(s). Use of the machine check interrupt may function to guarantee that free space will be available before data is dropped. Consequently, a smaller or no amount of free memory may be reserved before generating an interrupt. The machine check interrupt may thus facilitate fewer interrupts and larger available memory space, allowing higher system performance.

An embodiment of a memory controller may include a sectors used register that includes a running count of physical memory currently in use. Two or more configurable memory usage threshold values may be kept in sectors used threshold registers. Each sectors used threshold register may be software configurable to initiate one of several interrupt types. Illustrative interrupt types may include a maskable interrupt, a non-maskable interrupt, and a machine check interrupt. Each interrupt may be delivered to one or more processors in a computer system, depending on the interrupt type and register configuration.

The maskable interrupt may be configured to cause a thread, a socket, or a processor core to save its state of execution and to cause the interrupt handler to make memory available memory. However, the interrupt handler code may mask, or delay, processing of the maskable interrupt depending upon system configuration and concurrent processing demands. The non-maskable interrupt may be non-maskable and may guarantee that the software receives the non-maskable interrupt. The machine check interrupt may be used in conjunction with the above, less severe interrupts to stop all processor sockets, cores, and/or threads. The maskable, non-maskable, and machine check interrupts may thus comprise a tiered hierarchy of interrupts that progressively affects system operations more severely based on a detected level, or memory capacity, of available memory. The memory capacity may be increased or decreased in response to a memory compression operation. For purposes of this specification, a memory compression operation may include either a data compression or data decompression procedure.

When the available memory capacity is approaching a first, non-critical level, the memory controller may raise the maskable interrupt. If the interrupt handler in the hypervisor or the operating system receives the maskable interrupt, the interrupt handler may attempt to create available physical memory. However, there is no guarantee that the maskable interrupt will not be masked or will be handled in time to preserve available memory. Where the maskable interrupt is masked, not handled, or not received by the interrupt handler, the memory shortage may become more critical.

In response to detecting a second, more critical level of available memory, the memory controller may raise the non-maskable interrupt. The non-maskable interrupt may be guaranteed to be received by the interrupt handler. However, the interrupt handler may not handle the non-maskable interrupt correctly. For example, a flaw or bug in the software of the interrupt handler, the hypervisor, or the operating system may result in a failure to create available memory. Memory may also be allowed to become exhausted when input/output (I/O) devices are streaming into memory. Additionally, data patterns may continue to change and consume more physical memory, causing the system to continue to run out of memory. Where the system includes multiple processor sockets, multiple cores on each processor, and multiple threads on each processor core, all sockets, cores, and/or threads besides the one receiving the interrupt may continue to use more memory. For example, other threads may consume remaining memory before the interrupted thread frees more space, resulting in lost data.

Where the maskable interrupt does not succeed in making more memory available, and the memory is approaching a third, critical level, the machine check interrupt may be raised as a highest priority interrupt. The machine check interrupt may halt all activity (e.g., including I/O operations). The machine check handler may attempt to create free physical memory by invalidating and removing rarely used memory pages to disk. Alternatively or additionally, the machine check handler may write memory content to a second tier memory, such as a flash or solid-state drive (SSD) memory, to create additional free memory. Direct memory access writes may not be accepted while the machine check handler attempts to create free space in the memory.

The second tier memory may include overflow from overcommitted memory. Data (e.g., a page) removed from physical memory space may be moved into the second tier of memory instead of disk storage. When data compression ratios improve and free physical memory space becomes available, data from the second tier may be moved back to the physical memory. Use of the second tier memory in this manner may realize higher performance as compared to moving data back and forth to disk storage.

Software code used to free up physical memory space (e.g., the machine check handler) may be mapped into uncompressed and non-overcommitted memory. Retrieval of the software code, itself, may thus not increase physical memory usage and result in running out of the physical memory used to hold the uncompressed code for execution.

The sectors used threshold registers may be used to initiate a maskable interrupt to the hypervisor or to the operating system in response to the available memory increasing to a desired threshold. Such a desired threshold may correspond to a memory capacity where data can be swapped back into physical memory. Multiple sectors used threshold register thresholds may be used for hierarchical signaling to the hypervisor or to the operating system to communicate that there is sufficient available memory space. Alternatively, the hypervisor or the operating system may poll the sectors used threshold register to evaluate the amount of free space to learn when more data can be moved from disk to physical memory.

In addition to the sectors used register, the memory controller may include software configurable sectors used threshold registers. The thresholds of the sectors used threshold registers may be set by an administrator. In a particular embodiment, the memory controller may include four sectors used threshold registers that may function as threshold levels. Fewer or more sectors used threshold registers may be included in another embodiment. A sectors used threshold register may be used to determine when and what type of exception is caused when the thresholds are crossed. Each sectors used threshold register may be configurable by software writing in to it. A threshold and an exception type may be written by software to each sectors used threshold register. Where the sectors used register value crosses over a sectors used threshold register value (threshold value), the memory controller may raise an exception. For example, the memory controller may raise an exception where the sectors used register value is less than or equal to a first sectors used threshold register, followed by the sectors used register value being greater than a first sectors used threshold register.

Crossing a second sectors used threshold register value in an opposite direction may similarly raise an exception associated with an interrupt. Interrupt types and threshold values may be set based on a priority of the exception. Each sectors used threshold register may raise a different type of exception available on the system. For example, software may configure a first sectors used threshold register to raise a regular device interrupt, or maskable interrupt. The sectors used threshold register may include a low threshold value. An administrator may configure a second sectors used threshold register to raise a non-maskable interrupt and to include a higher threshold value. A third sectors used threshold register may raise a machine check interrupt and may be associated with a highest threshold value. As the threshold levels increase (nearing memory overflow), the priority of the interrupts may be proportionally higher. The opposite may be true when the sectors used register crosses a sectors used threshold register value while decreasing.

The machine check handler and operating system paging software that manages overcommitted memory may run in a non-overcommitted region of memory. Non-overcommitted memory may include memory space not subject to physical memory exhaustion. A system may create and maintain non-overcommitted memory by statically initializing memory configuration registers during power up to separately define non-overcommitted and overcommitted address space ranges. Alternatively or additionally, selected real memory ranges may be dynamically switched during runtime from overcommitted to non-overcommitted regions and vice versa. Native memory attached to processor sockets may be designated to not be subject to over commitment. A memory may create a non-overcommitted memory by configuring the memory to include a permanently uncompressed address range. Executing the hypervisor and operating system code out of non-overcommitted memory may minimize the impact of retrieving the code on critical memory.

Figure 1:
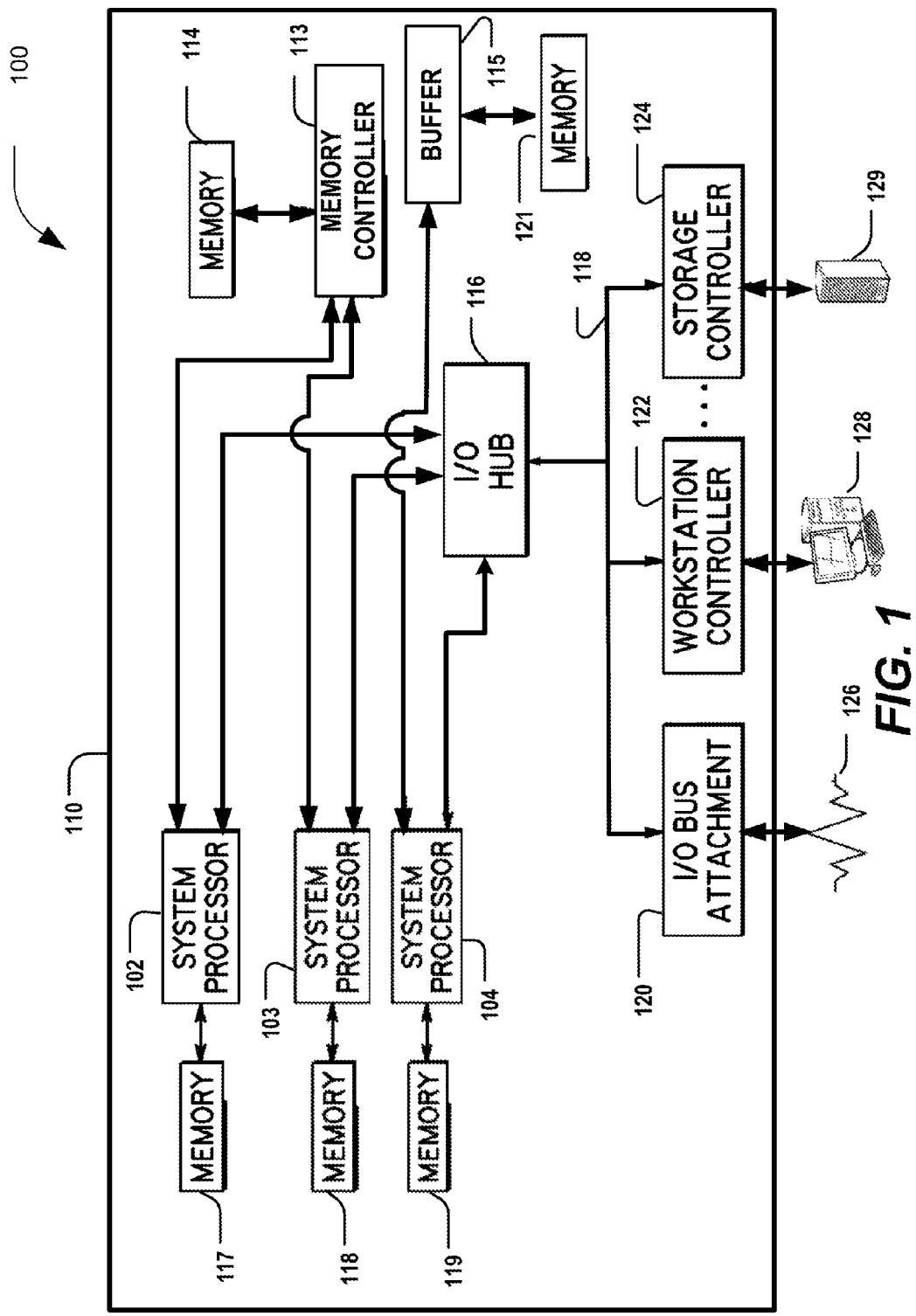
FIG. 1 is a block diagram of an embodiment of a computing system configured to manage compressed memory using a tiered hierarchy of interrupts associated with different levels of available memory.

Turning more particularly to the drawings, FIG. 1 illustrates a data processing apparatus 100 configured to execute methods of an embodiment that manages compressed memory using a tiered hierarchy of interrupts that progressively affects system operations more severely based on a detected level of available memory. A machine check interrupt may be configured to temporarily halt all threads on all cores of all processors 102-104 of the apparatus 100. The apparatus 100 may generically represent any of a number of multi-user computer systems such as a network server, a midrange computer, and a mainframe computer, among others. However, embodiments may be implemented in another data processing apparatus, e.g., in stand-alone or single-user computer systems such as workstations, desktop computers, portable computers, and the like, or in other computing devices such as embedded controllers. One implementation of the apparatus 100 may be a multi-user computer, such as the Power Systems computer available from International Business Machines Corporation (IBM).

The apparatus 100 may include memory (e.g., memory 114, 117-119, 121) having compressed data. The memory storing the compressed data may present larger real address space to the processors 102-104 and I/O devices than does the physical memory (e.g. dynamic random access memory). The real address space may be over committed (e.g., by a factor of four). Occasionally, the data may change due to patterns that do not compress well. If the data patterns change such that the physical memory becomes close to fully consumed, a hypervisor or an operating system may attempt to stop the system from running out of physical memory. For example, least recently used pages may be identified as candidates for removal to disk.

An embodiment may enable memory compression logic to signal the hypervisor or the operating system that physical memory is running out, while minimizing performance impact due to unnecessary interrupts. Unnecessary interrupts may fail to account for additional memory becoming available and may waste CPU cycles. An embodiment may enable more usable physical memory by limiting the amount of free physical memory space before having to signal the operating system about a low free memory condition. That is, processing may not be halted while there remains a significant amount of available physical memory because the tiered hierarchy of interrupts (including the machine check interrupt) may make the apparatus more responsive to precisely tracked memory thresholds. This feature may maximize memory usage. The additional usable physical memory space results in additional system performance.

The physical processors 102-104 may be coupled to an input/output (I/O) hub 116. A socket of one or more the processors 102-104 may directly and respectively attach to a memory 117-119, e.g., an array of dual in-line memory modules (DIMMs). The physical processors 102-104 may be multithreaded. Multithreading enables the physical processors 102-104 to concurrently execute different portions of program code. The processors 102, 103 may be in communication with a memory controller 113 that is coupled to an additional memory 114. A buffer 115 and an additional memory 121 may be coupled to the processor 104.

The I/O hub 116 may further couple to a number of types of external I/O devices via a system bus 118 and a plurality of interface devices. Illustrative I/O devices include a bus attachment interface 120, a workstation controller 122, and a storage controller 124. Such I/O devices may respectively provide external access to one or more external networks 126, one or more workstations 128, and/or one or more storage devices, such as a direct access storage device (DASD) 129.

Figure 2:
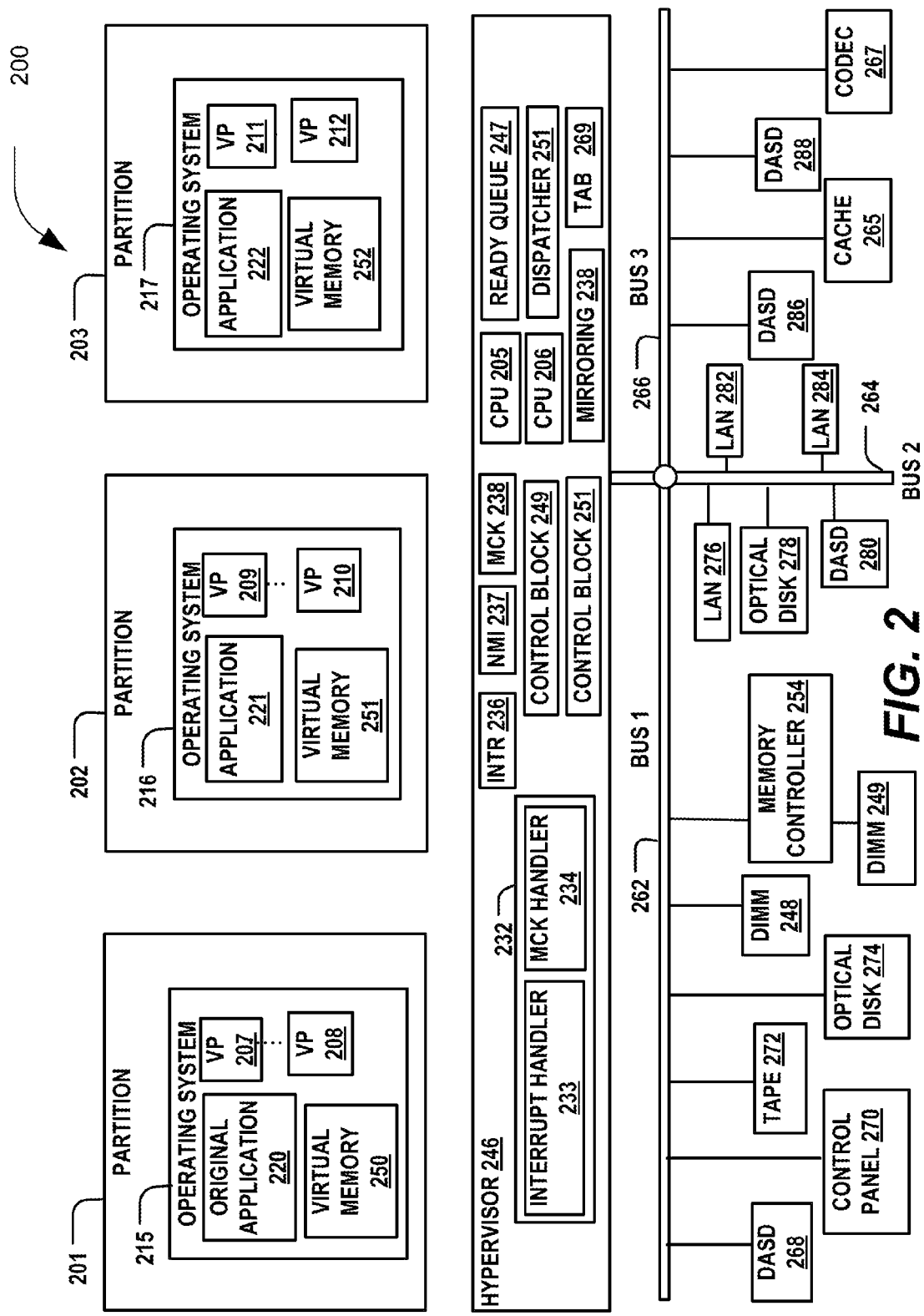
FIG. 2 is a block diagram illustrating in greater detail the primary software components and resources used to implement a logically partitioned environment consistent with the computing system of FIG. 1.

FIG. 2 illustrates in greater detail the primary software components and resources used to implement a logically partitioned environment consistent with the apparatus 100 of FIG. 1. FIG. 2 generally shows a computing architecture characterized as a virtual machine design developed by IBM. The system 200 includes a plurality of partitions 201-203 that share common processing resources among multiple processes. Such an architecture may rely upon a single computing machine having one or more central processing units (CPUs) 205, 206. The CPUs 205, 206 may execute software configured to simulate multiple virtual processors 207-212.

The partitions 201-203 may logically comprise a portion of a system's physical CPUs 205, 206, DASD 268, and other resources, as assigned by an administrator. Each partition 201-203 typically hosts an operating system 215-217 that includes the virtual processors 207-212. Each partition 201-203 may operate as if it is a separate computer. As shown in FIG. 2, the production environment comprising each partition 201-203 may also include program code, such as the applications 220-222 shown in FIG. 2.

An underlying program called a hypervisor 246, or partition manager, may assign physical resources to each partition 201-203. In virtualization technology, the hypervisor 246 may manage the operating systems 215-217 (or multiple instances of the same operating system) on a single computer system. The hypervisor 246 may manage the system's processor, memory, and other resources to allocate resources to each operating system 215-217. For instance, the hypervisor 246 may intercept requests for resources from the operating systems 215-217 to globally share and allocate resources. If the partitions 201-203 are sharing processors, the hypervisor 246 may allocate physical processor cycles between the virtual processors 207-212 of the partitions 201-203 sharing one or more of the CPUs 205, 206.

The hypervisor 246 may include a non-overcommitted memory 232. The non-overcommitted memory 232 may include a permanently uncompressed address range. Executing the hypervisor code out of the non-overcommitted memory 232 may minimize the impact of retrieving the code on critical memory. An interrupt handler 233 may be included within the non-overcommitted memory 232. The interrupt handler 233 may include a callback subroutine whose execution is triggered by the reception of an interrupt. For example, an illustrative subroutine may halt a process of a thread, socket, or core, and may create additional available memory.

A machine check (MCK) handler code 234 may additionally be included within the non-overcommitted memory 232. In response to receiving a machine check interrupt 238, the machine check handler 234 may take corrective action and resume workload execution if the corrective action is successful. For example, the machine check handler 234 may signal the hypervisor 246 or an operating system 215-217 to use existing paging mechanisms to create additional free physical memory space to hold expanding compressed data. The machine check interrupt 238 may be used only if one or more other interrupts are not serviced before memory is exhausted. Because the machine check interrupt 238 may stop all threads from executing workload, the machine check interrupt 238 may have a relatively larger impact on performance than the maskable interrupt (INTR) 236 and the non-maskable interrupt (NMI) 237, which may be configured to affect only a single thread, socket, or processor. The machine check handler 234 may attempt to create free physical memory by invalidating and removing rarely used memory pages to disk. Alternatively or additionally, the machine check handler 234 may write memory content to a second tier memory. In another embodiment, either or all of the non-overcommitted memory 232, the interrupt handler 233, and the machine check handler 234 may be included within an operating system.

The hypervisor 246 may include a memory minoring algorithm 238 configured to transition from uncompressed, primary memory, (such as may be stored at DIMM 248) to compressed, mirrored memory (e.g., at DIMM 249). The memory minoring algorithm 238 may transition CPU accesses to the mirrored memory when a failure is detected in the primary memory. In another embodiment, a memory mirroring program may be included within an operating system.

Each operating system 215-217 may control the primary operations of its respective logical partition 201-203 in the same manner as the operating system of a non-partitioned computer. Each logical partition 201-203 may execute in a separate memory space, represented by virtual memory 250-252. Moreover, each logical partition 201-203 may statically and/or dynamically allocate a portion of available resources in the system 200. For example, each logical partition 201-203 may share one or more of the CPUs 205, 206, as well as a portion of the available memory space for use in virtual memory 250-52. In this manner, a given CPU 205, 206 may be utilized by more than one of the logical partitions 201-203.

The hypervisor 246 may include a dispatcher 251 that manages the dispatching of virtual processors 207-212 to the CPUs 205, 206 on a dispatch list, or ready queue 247. The ready queue 247 comprises memory that includes a list of the virtual processors 207-212 having work that is waiting to be dispatched on a CPU 205, 206. The hypervisor 246 shown in FIG. 2 also controls the CPUs 205, 206, and may additionally control a memory controller 254 and the DIMMs 248, 249. Processor control blocks 249 of the hypervisor 246 include memory that includes a list of the virtual processors 207-212 waiting for access on the CPUs 205, 206.

Additional resources, e.g., mass storage, backup storage, user input, network connections, and the like, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may be allocated to multiple logical partitions 201-213 at a time. FIG. 2 illustrates, for example, three logical buses 262, 264 and 266, with a plurality of resources on the bus 262, including a direct access storage device (DASD) 268, a control panel 270, a tape drive 272 and an optical disk drive 274, allocated to a partition.

The bus 264 may have resources allocated on a resource-by-resource basis, e.g., with a local area network (LAN) adaptor 276, optical disk drive 278 and a DASD 280 allocated to logical partition 202, and LAN adaptors 282, 284 allocated to logical partition 203. The bus 266 may represent, for example, a bus allocated specifically to the logical partition 203, such that all resources on the bus 266 (e.g., the DASDs 286, 288), are allocated to the same logical partition 203. The hardware shown in FIG. 2 optionally includes one or more caches 265.

FIG. 3 shows an embodiment of a memory compression computing system 300 that includes two processors 302, 312 that each has directly attached memory 304, 308, 314, and 318. The processors may be coupled to one another via a processor bus 305. The system 300 may be configured to use a tiered hierarchy of interrupts to manage memory within an environment that includes compressed memory. More particularly, the system 300 includes data in uncompressed, primary memory 306, 316, 322 that may be mirrored in compressed, mirrored memory 310, 320. The processors 302, 312 may be similar to the processors 101-103 of FIG. 1 and to the CPUs 205, 206 of FIG. 2. The memory 304, 308, 314, and 318 may be similar to the memory 117-119 of FIG. 1 and to the DIMMs 248, 249 of FIG. 2.

The system 300 also includes a memory controller 303 and buffers 313, 317. The memory controller 303 may be similar to the memory controller 113 of FIG. 1, and the buffers 313, 317 may each be similar to the buffer 115 of FIG. 1. Hardware of the memory controller 303 of FIG. 3 may include a sectors used register (SUR) 330. The sectors used register 330 may keep a running count of physical memory usage. The memory controller 303 may further include multiple software configurable sectors used threshold registers (SUTRs) 331-334 that may function as threshold levels. The thresholds of the sectors used threshold registers 331-334 may be set by an administrator. Fewer or more sectors used threshold registers may be included in another embodiment.

The sectors used threshold registers 331-334 may be used to determine when and what type of exception is caused when the thresholds are crossed. Each sectors used threshold register 331-334 may be software configurable. For example, a threshold and an interruption type may be written to each sectors used threshold register 331-334. Where the sectors used register value crosses over a sectors used threshold register value, the memory controller 303 may raise an exception. For instance, the memory controller 303 may raise an exception where the sectors used register value is less than or equal to a first sectors used threshold register value, followed by the sectors used register value being greater than a first sectors used threshold register value.

Crossing a second sectors used threshold register 331-334 in an opposite direction may similarly raise an exception associated with another interrupt. Interrupt types and threshold values may be set based on a priority of the exception. Each sectors used threshold register 331-334 may raise a different type of exception available on the system 300. For example, software may configure a first sectors used threshold register 331 to raise a regular device interrupt, or maskable interrupt. The sectors used threshold register 331 may include a relatively low threshold value. An administrator may configure a second sectors used threshold register 332 to raise a non-maskable interrupt and to include a higher threshold value. A third sectors used threshold register 333 may raise a machine check interrupt and may be associated with a highest threshold value. As the threshold levels increase (nearing memory overflow), the priority of the interrupt may be proportionally higher. The opposite may be true when the sectors used register 330 crosses a sectors used threshold register value while decreasing.

According to a particular embodiment, a sectors used threshold register 331 may be used to initiate sending a maskable interrupt to the hypervisor or to the operating system in response to the available memory increasing to a preset threshold. Such a threshold may correspond to a memory capacity where data can be swapped back into physical memory. The sectors used threshold register thresholds may be used for hierarchical signaling to the hypervisor or to the operating system to communicate that there is sufficient available memory space. Alternatively, the hypervisor or the operating system may poll the sectors used threshold registers 331-334 to evaluate the amount of free space to learn when more data can be moved from disk to physical memory.

The memory controller 303 may additionally include a digital circuit external to the first processor 302 that is configured to manage a flow of data between at least two of the processors 302, 312, the buffers 313, 317, and the memories 304, 308, 314, 318. The buffers 313, 317 may be configured to work in conjunction with one or more of the processors 302, 312 to temporarily hold data while it is being moved between at least two of the processors 302, 312, the buffers 313, 317, and the memories 304, 308, 314, 318. The memory controller 303 may be coupled in between the first processor 302 and the second memory 308 that includes a first DIMM mirrored memory 310.

While the sectors used threshold register 330 and the sectors used threshold registers 331-334 of the memory controller 303 may manage memory for the entire system 300, the embodiment of FIG. 3 illustrates the second processor 312 as including its own sectors used threshold register 335 and sectors used threshold registers 336-339 to manage memory.

The buffer 313 may be coupled in between the second processor 312 and the third memory 314 that includes a second array of DIMM primary memory 316. The third buffer 317 may be coupled in between the second processor 312 and the fourth memory 318 that includes the array of DIMM mirrored memory 320 and the third array of DIMM primary memory 322.

In the embodiment of FIG. 3, the first DIMM mirrored memory 310 may mirror the second array of DIMM primary memory 316, as indicated by the arrow 324. The first DIMM mirrored memory 310 may include compressed data. For example, the first DIMM mirrored memory 310 may include a compressed version of the data in the second array of DIMM primary memory 316.

The array of DIMM mirrored memory 320 may minor the first array of DIMM primary memory 306, as indicated by arrow 326. The array of DIMM mirrored memory 320 may include compressed data. For example, the array of DIMM mirrored memory 320 may include a compressed version of the data in the first array of DIMM primary memory 306. The compression ratio of the compressed data in the array of DIMM mirrored memory 320 as compared to the uncompressed data in the first array of DIMM primary memory 306 may be about four to one, as with the first DIMM mirrored memory 310.

As indicated by arrow 328, the array of DIMM mirrored memory 320 may minor the second array of DIMM primary memory 316. For example, one or more of the processors 302, 312 the memory controller 303, and the buffers 313, 317 may replicate and compress data of the second array of DIMM primary memory 316 to be stored in the array of DIMM mirrored memory 320.

One or more of the first processor 302, the second processor 312, the memory controller 303, the buffer 313, and the buffer 317 may include compression logic to compress data when stored in the first DIMM mirrored memory 310 and the array of DIMM mirrored memory 320. At least one of a hypervisor and an operating system, such as the hypervisor 246 and the operating system 215 of FIG. 2, may be configured to control the transition from accessing the second array of DIMM primary memory 316 to accessing the first DIMM mirrored memory 310.

FIG. 4 shows an embodiment of a method 400 of managing compressed memory use a tiered hierarchy of interrupts that affects system operations based on detected levels of available memory. For example, processes may be progressively affected more severely as memory capacity becomes more limited. Conversely, interrupts may progressively enable processes, as memory capacity recovers. The method 400 may use a machine check interrupt configured to temporarily halt all threads on all cores of all processors of a computer system. The method 400 may be executed by one of the systems 100, 200, and 300 of FIGS. 1-3.

Turning more particularly to the flowchart, a system may conduct normal memory compression management processes, at 402. For example, the system may access and use physical memory in the course of normal memory compression operations. The system may determine at 404 that a value of a sectors used register is larger than a threshold value of a first sectors used threshold register. For example, the memory controller 303 of FIG. 3 may detect that the value of the sectors used register 330 is larger than the threshold value of the sectors used threshold register 331. In another embodiment, a hypervisor or an operating system may poll the sectors used threshold register to evaluate the amount of free space.

Where the value of a sectors used register is alternatively determined to be greater than the threshold value of the first sectors used threshold register, a first interrupt may be initiated, at 406. For example, the maskable interrupt 236 of FIG. 2 may be initiated by the memory controller 254. The maskable interrupt 236 may be sent to the interrupt handler 233 of the hypervisor 246. The interrupt handler 233 may attempt to respond to the maskable interrupt 236 by creating additional memory.

The system may determine at 408 that a value of the sectors used register is less than the threshold value of the first sectors used threshold register. For example, the memory controller 303 of FIG. 3 may detect that the value of the sectors used register 330 is less than the threshold value of the sectors used threshold register 331. Where the value of the sectors used register is determined to be less than the threshold value of the sectors used threshold register, memory pages may be moved at 410 from disk to physical memory (e.g., dynamic random access memory).

Where the value of the sectors used register is alternatively determined to be greater than the threshold value of the first sectors used threshold register, the system may determine at 412 that the value of the sectors used register is larger than the threshold value of a second sectors used threshold register. For example, the memory controller 303 of FIG. 3 may detect that the value of the sectors used register 330 is larger than the threshold value of the sectors used threshold register 332.

Where the value of the sectors used register is larger than the threshold value of the second sectors used threshold register, a second interrupt may be initiated at 414. For example, a non-maskable interrupt 237 may be initiated by the memory controller 254 of FIG. 2. The non-maskable interrupt 237 may be sent to the interrupt handler 233 of the hypervisor 246. The interrupt handler 233 may attempt to respond to the non-maskable interrupt 237 by creating additional memory. Where the value of the sectors used register is alternatively smaller than the threshold value of the second sectors used threshold register, the system may determine at 408 if a value of the sectors used register is less than the threshold value of the first sectors used threshold register.

The system may determine at 416 that a value of the sectors used register is less than the threshold value of the first sectors used threshold register. For example, the memory controller 303 of FIG. 3 may detect that the value of the sectors used register 330 is less than the threshold value of the sectors used threshold register 331. Where the value of the sectors used register is determined to be less than the threshold value of the sectors used threshold register, memory pages may be moved at 410 from disk to physical memory.

Where the value of the sectors used register is alternatively determined to be greater than the threshold value of the first sectors used threshold register, the system may determine at 418 that the value of the sectors used register is larger than the threshold value of a third sectors used threshold register. For example, the memory controller 303 of FIG. 3 may detect that the value of the sectors used register 330 is larger than the threshold value of the sectors used threshold register 333.

Where the value of the sectors used register is larger than the threshold value of the third sectors used threshold register, a machine check interrupt may be initiated at 420. For example, the machine check interrupt 238 of FIG. 2 may be initiated by the memory controller 254. The machine check interrupt 238 may be sent to the machine check handler 234 of the hypervisor 246. The machine check handler 234 may attempt to respond to the machine check interrupt 238 by immediately halting and placing all threads under the control of the machine check handler 234. The machine check interrupt 238 may allow for recovery of the thread processes if a corrective action succeeds. That is, the machine check handler 234 may take corrective action and resume workload execution if the corrective action is successful. Where the value of the sectors used register is alternatively smaller than the threshold value of the third sectors used threshold register, the system may determine at 418 whether a value of the sectors used register is greater than the threshold value of the first sectors used threshold register.

FIG. 4 thus shows a flowchart of an embodiment of a method 400 of managing compressed memory that includes using a tiered hierarchy of interrupts that progressively affect system operations more severely based on detected levels of available memory. The method 400 may use a machine check interrupt configured to temporarily halt all threads on all cores of all processors of a computer system. Sectors used threshold registers may communicate to a hypervisor or operating system that physical memory is running out, while minimizing performance impacts due to unnecessary interrupts.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, while some of the above described embodiments may pertain to hardware interrupts, another embodiment of an interrupt may include "if then" or "branch conditional" software instructions that are based on the amount of physical memory available. Such conditional software interrupts may function similarly to a hardware interrupt in that execution may be stopped on the current process, and the memory handling code may begin to execute. A hardware interrupt may be asynchronous to the code operation and may come in at any point in the code, while a program implementation may have to specifically check the available memory using software code instructions. Thus, the present disclosure is not intended to be limited to the embodiments shown herein but is to be accorded the widest scope possible consistent with the principles and features as defined by the following claims.

The invention claimed is:

1. A method of managing memory, the method comprising:
   detecting a first memory usage level in excess of a first threshold level;
   initiating a maskable interrupt configured to affect a first process executing on a processor in response to the first detected memory level;
   detecting a second memory usage level in excess of a second threshold level;
   initiating a non-maskable interrupt configured to affect the first process executing on the processor in response to the second detected memory level; and
   detecting a third memory usage level in excess of a third threshold level;
   initiating a machine check interrupt configured to affect the first process executing on the processor in response to the third detected memory level.

2. The method of claim 1, further comprising halting a plurality of processes executing on a plurality of processors in response to receiving the machine check interrupt.

3. The method of claim 2, further comprising automatically resuming the plurality of processes executing on the plurality of processors.

4. The method of claim 1, further comprising configuring the non-maskable interrupt to have a more severe affect on the first process than the maskable interrupt.

5. The method of claim 1, further comprising configuring the non-maskable interrupt to have a greater likelihood of affecting the first process than the maskable interrupt.

6. The method of claim 1, further comprising configuring the non-maskable interrupt to have a less severe affect on the first process than the maskable interrupt.

7. The method of claim 1, further comprising detecting at least one of the maskable interrupt, the non-maskable interrupt, and the machine check interrupt.

8. The method of claim 1, wherein the first threshold level is larger than the second threshold level, and the second threshold level is larger than the third threshold level.

9. The method of claim 1, further comprising sending the first interrupt to an interrupt handler configured to initiate increasing the first threshold level.

10. The method of claim 1, further comprising configuring a threshold value of a sectors used threshold register, wherein the threshold value is associated with the first detected memory level.

11. The method of claim 1, further comprising storing overflow data in a flash memory device to create free memory.

12. The method of claim 1, further comprising accessing a sectors used register to determine the first threshold level.

13. An apparatus comprising:
a memory; and
a processor configured to execute a first process that accesses the memory, wherein the processor is further configured to initiate generating a maskable interrupt configured to affect execution of a first process in response to a first detected memory level, to initiate generating a non-maskable interrupt configured to affect the execution of the first process in response to a second detected memory level, and to initiate generating a machine check interrupt configured to affect the execution of first process in response to a third detected memory level.

14. The apparatus of claim 13, further comprising a plurality of processors executing a plurality of processes, wherein the machine check interrupt is configured to halt the plurality of processes executing on the plurality of processors.

15. The apparatus of claim 13, further comprising program code executable by the processor to generate the maskable interrupt, wherein the program code is stored in a separate memory.

16. The apparatus of claim 13, wherein the non-maskable interrupt is configured to affect the first process more than the maskable interrupt, and the machine check interrupt is configured to affect the first process more than the non-markable interrupt.

17. A program product, comprising:
program code, to initiate generating a maskable interrupt configured to affect execution of a first process in response to a first detected memory level, to initiate generating a non-maskable interrupt configured to affect the execution of first process in response to a second detected memory level, and to initiate generating a machine check interrupt configured to affect the execution of the first process in response to a third detected memory level; and
a tangible computer readable medium bearing the program code.

18. The program product of claim 17, further comprising a plurality of processors executing a plurality of processes, wherein the machine check interrupt program code is configured to halt the plurality of processes executing on the plurality of processors.

19. The program product of claim 18, further comprising program code configured to:
detect a fourth memory associated with at least one of the processors with a plurality of halted processes; and,
resume the plurality of halted processes on the at least one processor when the fourth memory level is less than the third memory level.

20. The program product of claim 17, wherein the non-maskable interrupt is programmed to affect the first process more than the maskable interrupt, and the machine check interrupt is programmed to affect the first process more than the non-maskable interrupt.

* * * * *